US012621135B2

(12) United States Patent
Sinha et al.

(10) Patent No.: US 12,621,135 B2
(45) Date of Patent: May 5, 2026

(54) METHOD AND APPARATUS FOR OPTIMIZING PERFORMANCE OF A QUANTUM KEY DISTRIBUTION (QKD) PROTOCOL

(71) Applicant: Raman Research Institute, Karnataka (IN)

(72) Inventors: Urbasi Sinha, Karnataka (IN); Sourav Chatterjee, West Bengal (IN)

(73) Assignee: RAMAN RESEARCH INSTITUTE, Bengaluru (IN)

( * ) Notice: Subject to any disclaimer, the term of this patent is extended or adjusted under 35 U.S.C. 154(b) by 73 days.

(21) Appl. No.: 18/668,421

(22) Filed: May 20, 2024

(65) Prior Publication Data

US 2024/0388425 A1     Nov. 21, 2024

(30) Foreign Application Priority Data

May 19, 2023    (IN) ............................. 202341035230

(51) Int. Cl.
H04L 9/08          (2006.01)
(52) U.S. Cl.
CPC .................................. H04L 9/0852 (2013.01)
(58) Field of Classification Search
CPC ........................... H04L 9/0852; H04L 9/3297
See application file for complete search history.

(56) References Cited

U.S. PATENT DOCUMENTS 11,451,308 B1 *   9/2022   Bucklew ............... H04B 10/60

* cited by examiner

*Primary Examiner* — Baotran N To
(74) *Attorney, Agent, or Firm* — Tarolli, Sundheim, Covell & Tummino LLP

(57)          ABSTRACT

The present disclosure relates to field of quantum cryptography that discloses method of optimizing performance of Quantum Key Distribution (QKD) protocol. Computing system (101) extracts one or more coincidence distribution sets generated from one or more timestamps detected during communication by one or more detector pairs associated with sender and receiver of communication. Further, computing system identifies one or more reference lines indicating signal value and noise value in each of one or more coincidence distribution sets. Thereafter, computing system determines time window in one or more coincidence distribution sets by iteratively adjusting one or more reference lines in incremental steps until at least one of, performance parameters, signal value and noise value within time window complies with predefined requirements. Finally, computing system optimizes performance of QKD protocol based on determined time window. present disclosure provides an advantage of optimizing individual Signal-to-Noise Ratio (SNR) while restricting QBER to predefined limit.

15 Claims, 19 Drawing Sheets

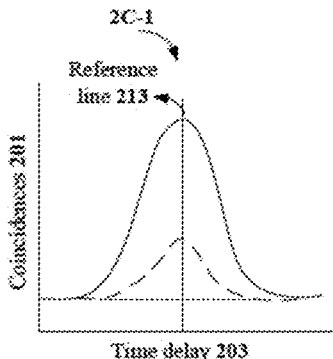
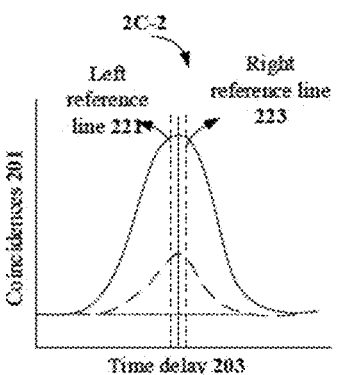
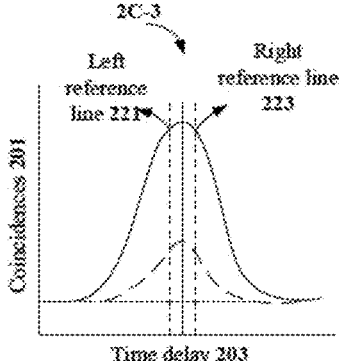
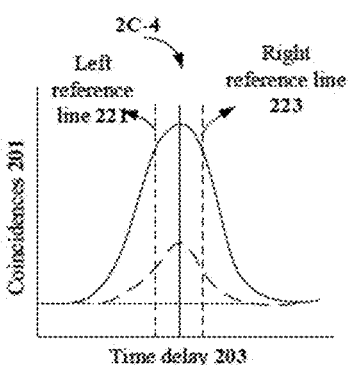
FIG. 2C

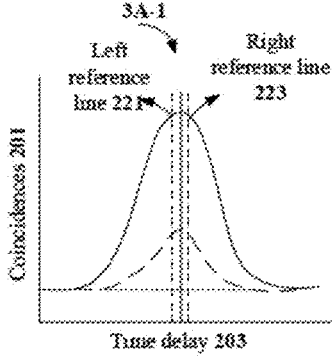
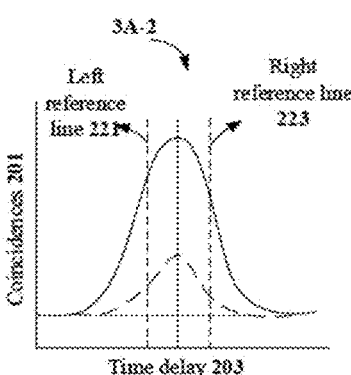
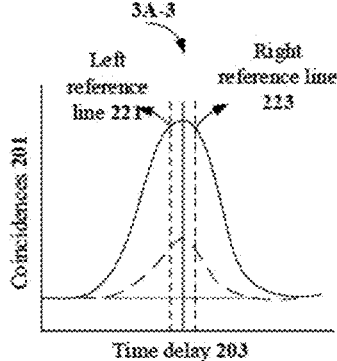
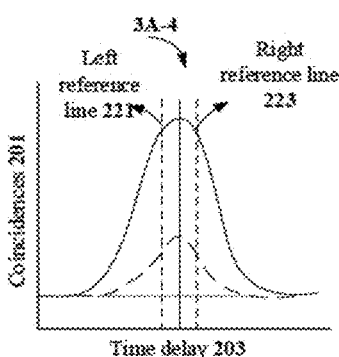
FIG. 3A

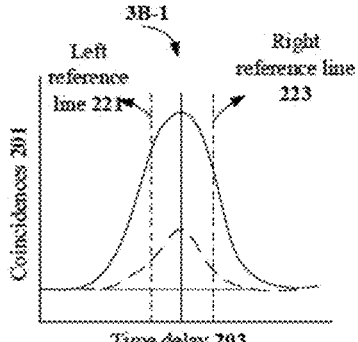
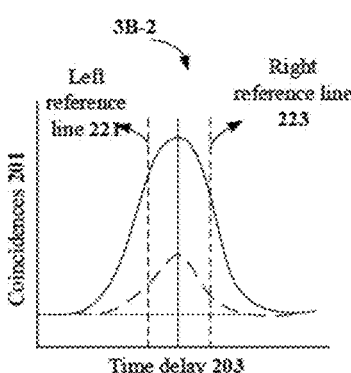
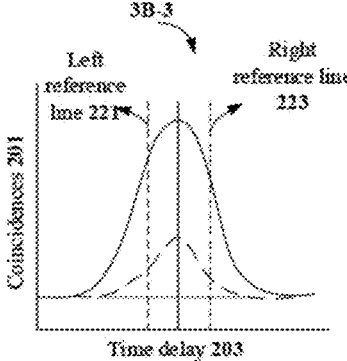
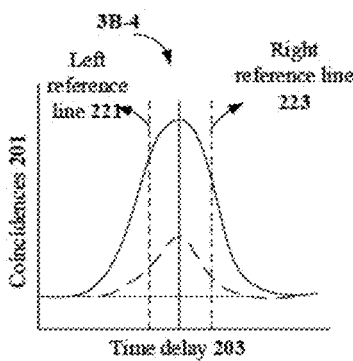
FIG. 3B

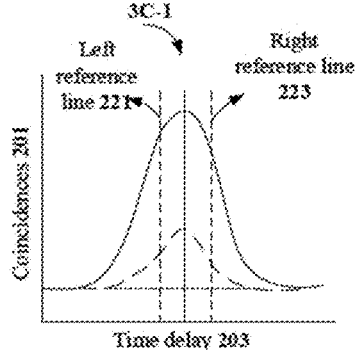
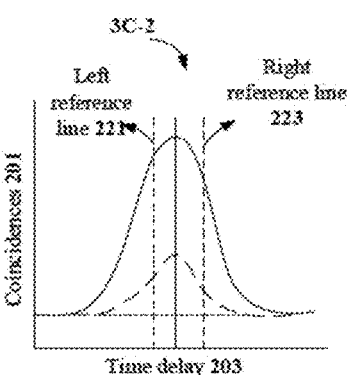
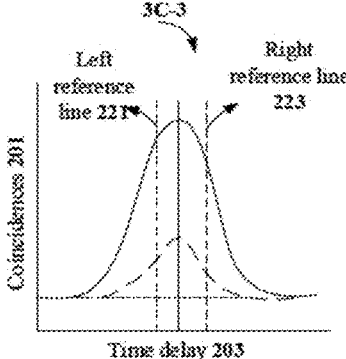
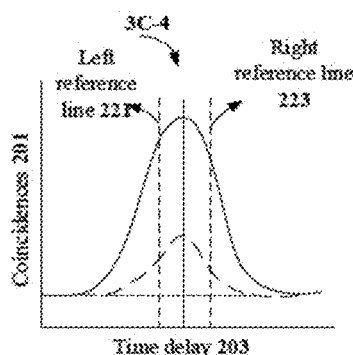
FIG. 3C

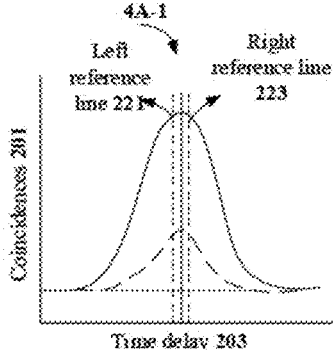
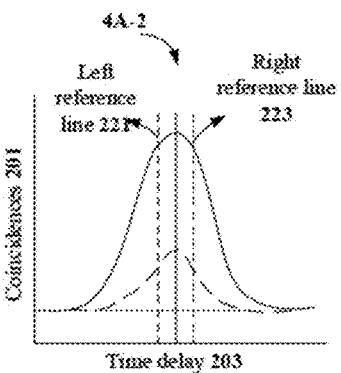
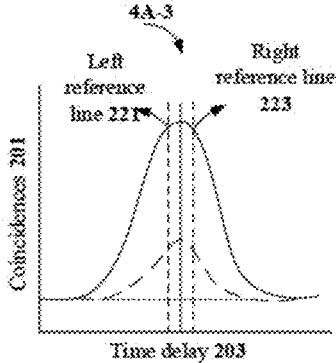
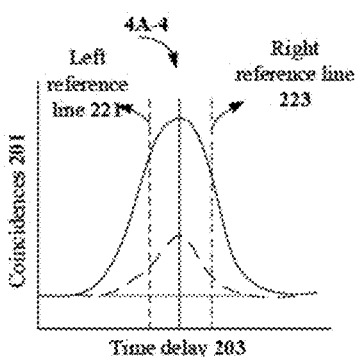
FIG. 4A

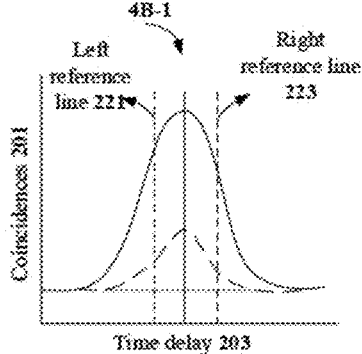
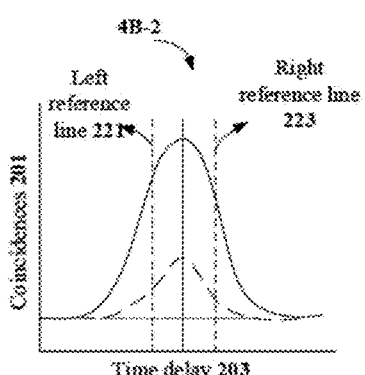
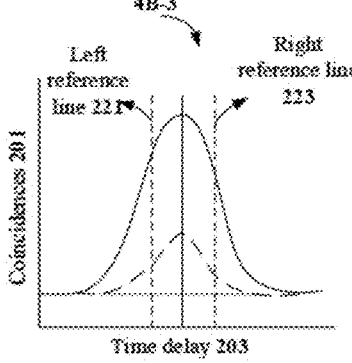
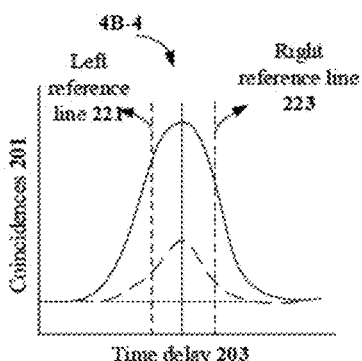
FIG. 4B

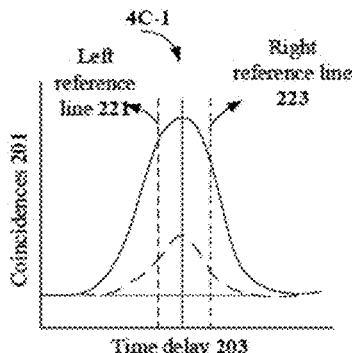
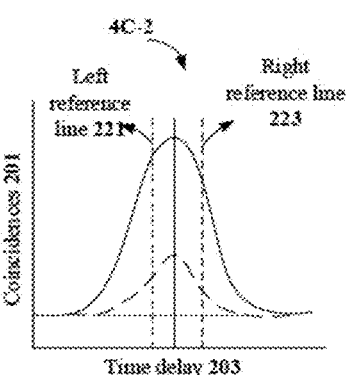
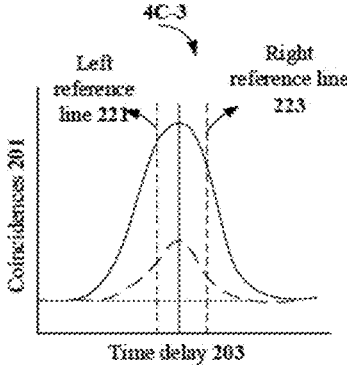
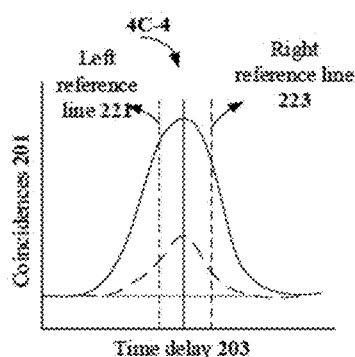
FIG. 4C

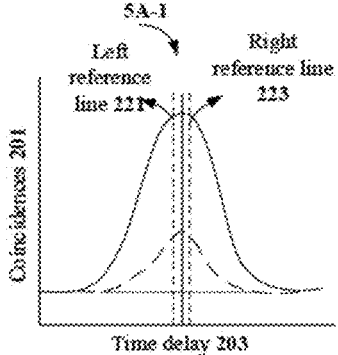
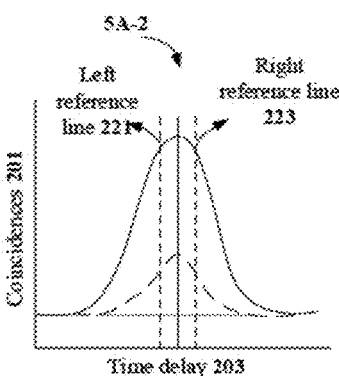
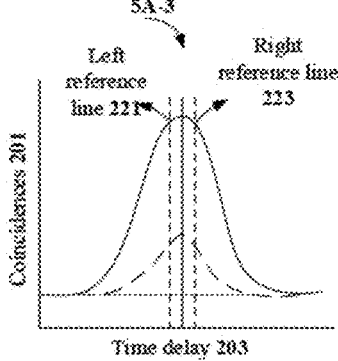
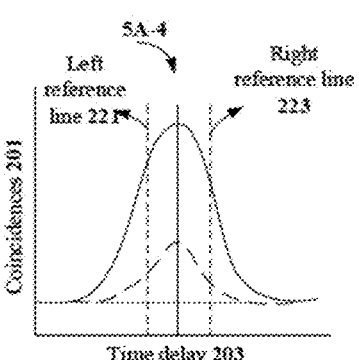
FIG. 5A

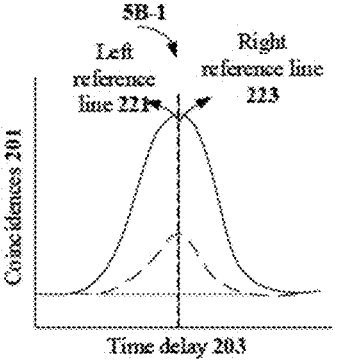
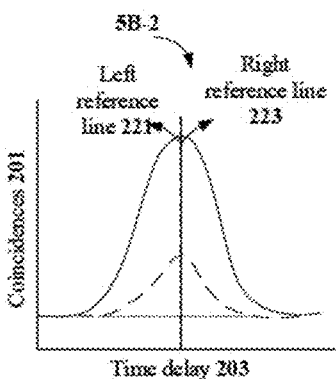
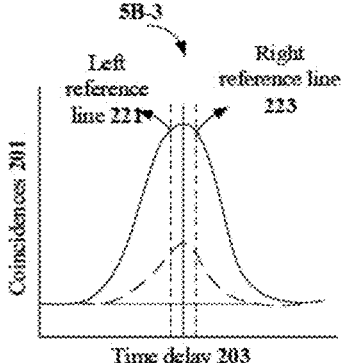
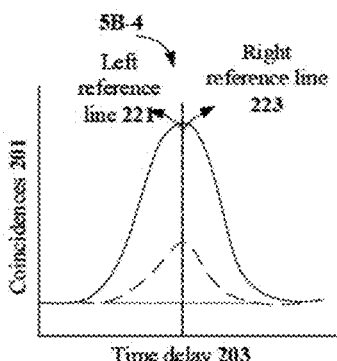
FIG. 5B

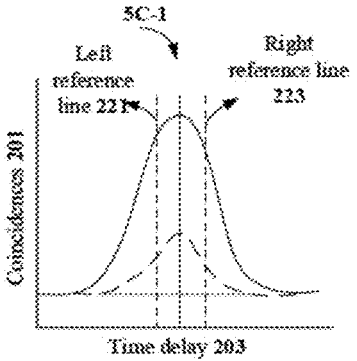
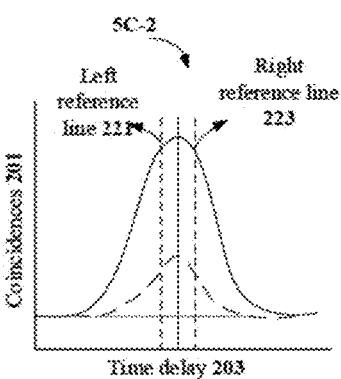
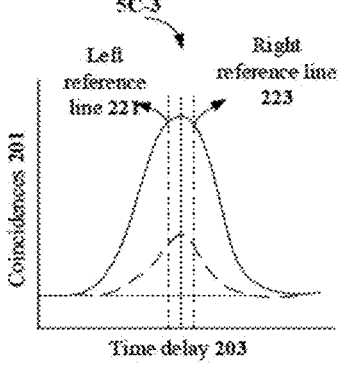
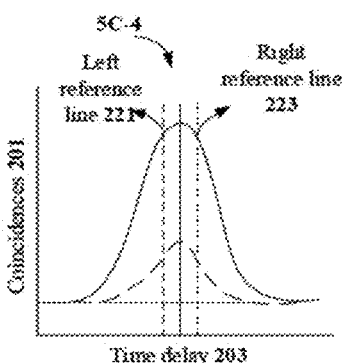
FIG. 5C

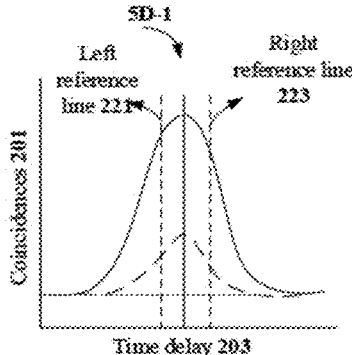
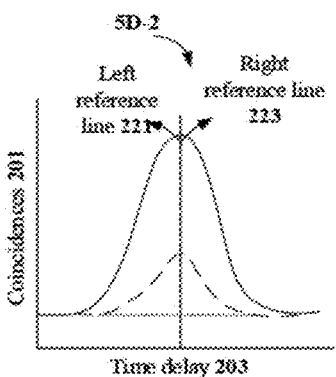
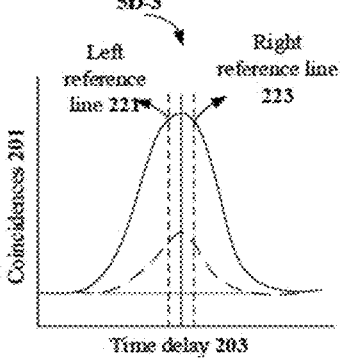
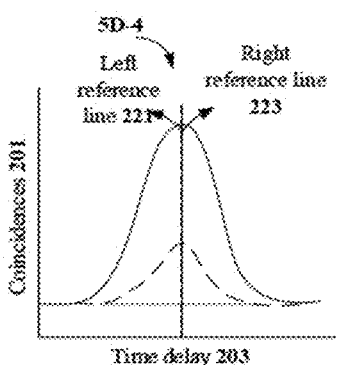
FIG. 5D

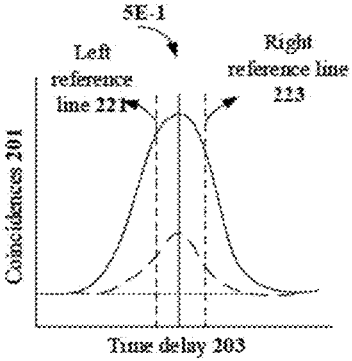
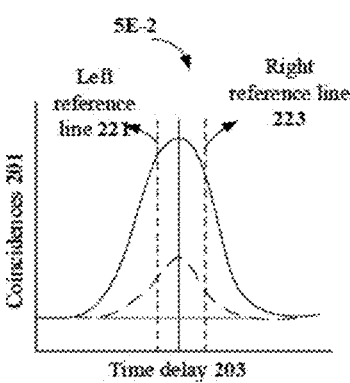
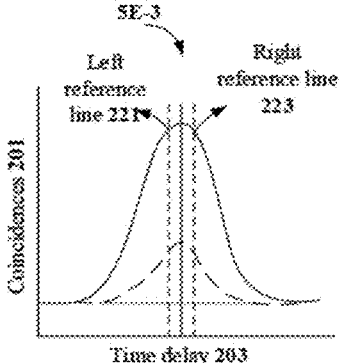
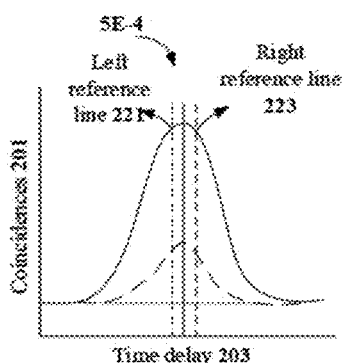
FIG. 5E

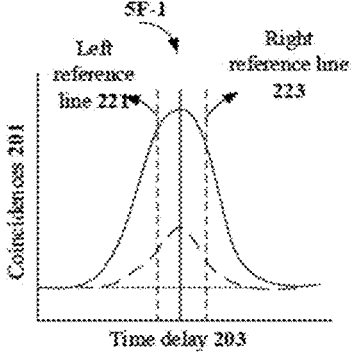
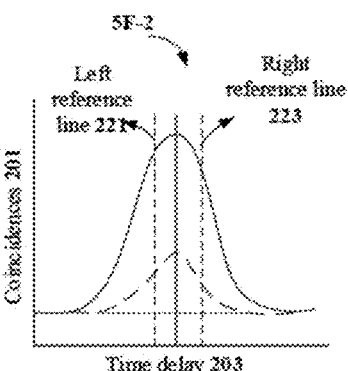
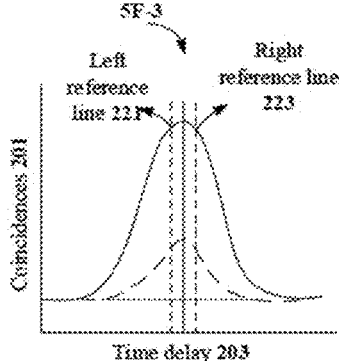
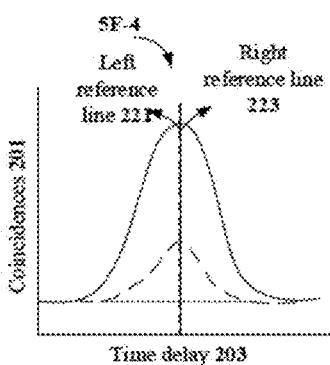
FIG. 5F

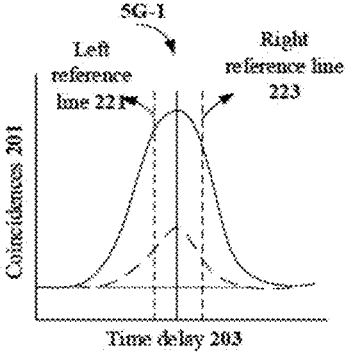
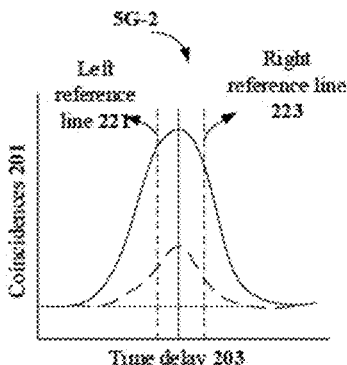
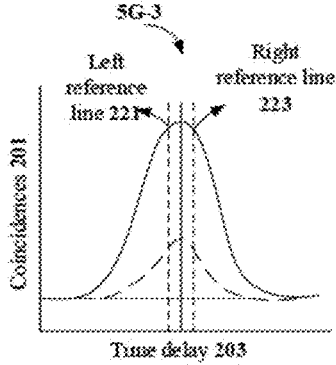
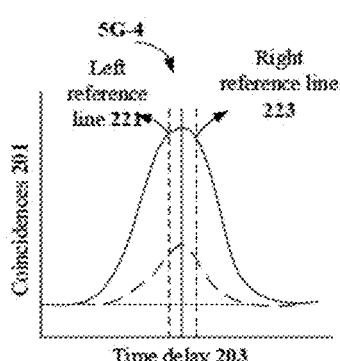
FIG. 5G

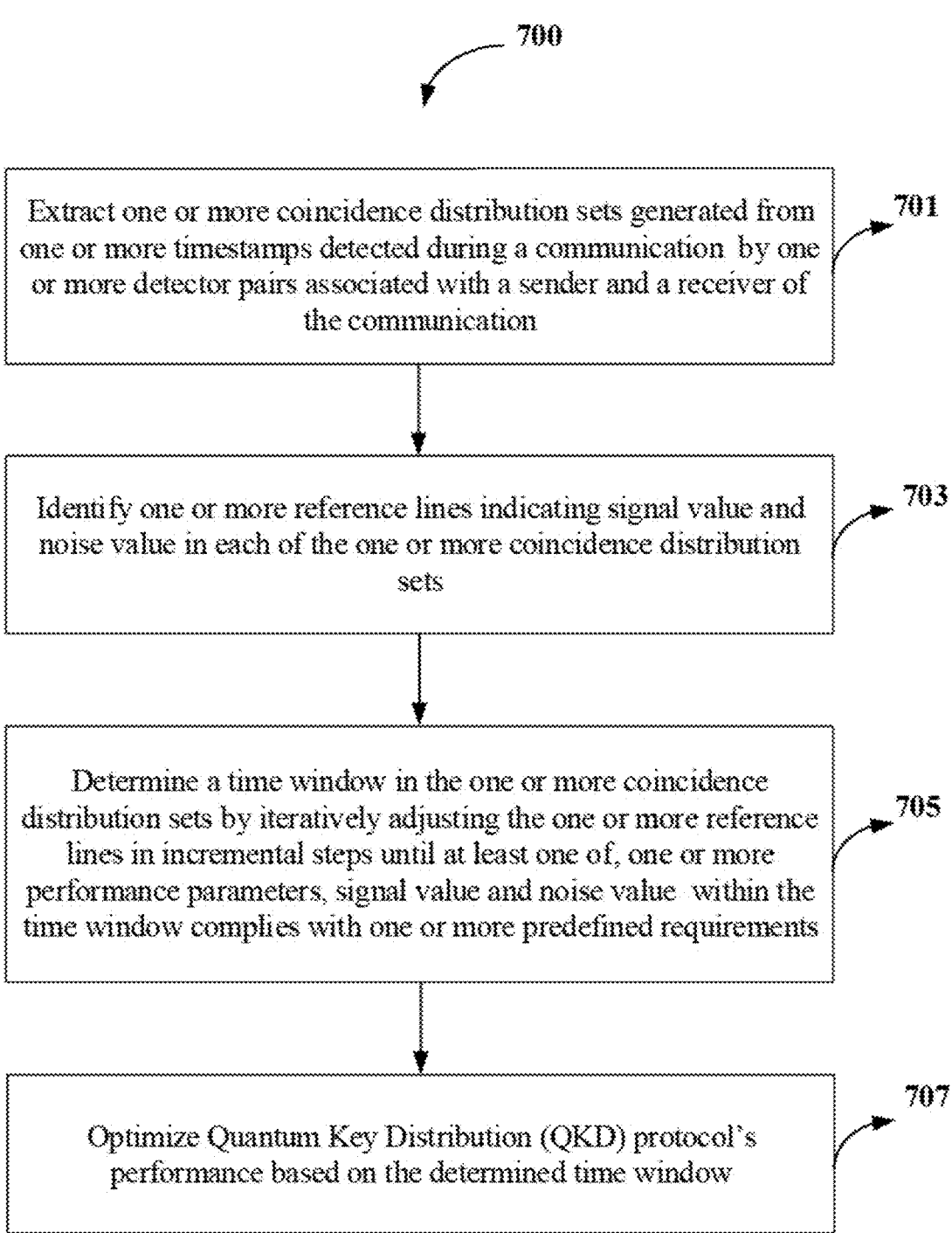

700

Extract one or more coincidence distribution sets generated from one or more timestamps detected during a communication by one or more detector pairs associated with a sender and a receiver of the communication — 701

Identify one or more reference lines indicating signal value and noise value in each of the one or more coincidence distribution sets — 703

Determine a time window in the one or more coincidence distribution sets by iteratively adjusting the one or more reference lines in incremental steps until at least one of, one or more performance parameters, signal value and noise value within the time window complies with one or more predefined requirements — 705

Optimize Quantum Key Distribution (QKD) protocol's performance based on the determined time window — 707

FIG. 7

METHOD AND APPARATUS FOR OPTIMIZING PERFORMANCE OF A QUANTUM KEY DISTRIBUTION (QKD) PROTOCOL

TECHNICAL FIELD

The present disclosure relates, in general, to quantum cryptography. Particularly, the present disclosure relates to a method and apparatus for optimizing performance of a Quantum Key Distribution (QKD) protocol.

BACKGROUND

Quantum Key Distribution (QKD) is a most rapidly developing technology of quantum cryptography. QKD protocol is utilized for providing a secure communication between a sender and a receiver. The QKD enables the sender and the receiver to securely communicate with each other by establishing a secret key string. In the QKD protocol, the parties can perform communication while maintaining the information-theoretically secure by encrypting messages using a one-time pad symmetric key algorithm. Further, in the QKD protocol, the security is guaranteed by the fundamental laws of quantum mechanics. Thus, detecting any eavesdropping activity.

The conventional technologies of assessing the performance of any QKD protocol generally include unoptimized data-analyses, where the two parties trying to establish a secret key string pre-agree upon a fixed coincidence window span and calculate the extractable key rate, the Quantum-Bit-Error-Rate (QBER), and the key symmetry within the fixed coincidence window span. However, by fixing a pre-agreed coincidence window span, without optimizing it, may often limit the scope of offering maximal key rate against minimal QBER for a particular protocol demonstration. Therefore, there is a need for a system to determine the coincidence window span dynamically that in turn is capable of offering maximal key rate against the minimal QBER.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of optimizing performance of a Quantum Key Distribution (QKD) protocol. The method of extracting, by a computing system, one or more coincidence distribution sets generated from one or more timestamps detected during a communication by one or more detector pairs associated with a sender and a receiver of the communication. Each coincidence distribution set in the one or more coincidence distribution sets comprises a signal coincidence distribution and a noise coincidence distribution. Further, the method comprises identifying one or more reference lines indicating signal value and noise value in each of the one or more coincidence distribution sets. The one or more reference lines comprises left reference line and right reference line. Thereafter, the method comprises determining a time window in the one or more coincidence distribution sets by iteratively adjusting the one or more reference lines in incremental steps until at least one of, one or more performance parameters, signal value and noise value within the time window complies with one or more predefined requirements. Finally, the method comprises optimizing performance of a QKD protocol based on the determined time window.

Further, the present disclosure relates to a computing system for optimizing performance of a Quantum Key Distribution (QKD) protocol. The computing system comprises a processor and a memory. The memory is communicatively coupled to the processor and stores processor-executable instructions, which on execution, cause the processor to extract one or more coincidence distribution sets generated from one or more timestamps detected during a communication by one or more detector pairs associated with a sender and a receiver of the communication. Each coincidence distribution set in the one or more coincidence distribution sets comprises a signal coincidence distribution and a noise coincidence distribution. Further, the processor identifies one or more reference lines indicating signal value and noise value in each of the one or more coincidence distribution sets. The one or more reference lines comprises left reference line and right reference line. Thereafter, the processor determines a time window in the one or more coincidence distribution sets by iteratively adjusting the one or more reference lines in incremental steps until at least one of, one or more performance parameters, signal value and noise value within the time window complies with one or more predefined requirements. Finally, the processor optimizes performance of a QKD protocol based on the determined time window.

Furthermore, the present disclosure relates to a non-transitory computer readable medium including instructions stored thereon that when processed by at least one processor, cause a computing system to perform operations comprising extracting one or more coincidence distribution sets generated from one or more timestamps detected during a communication by one or more detector pairs associated with a sender and a receiver of the communication. Each coincidence distribution set in the one or more coincidence distribution sets comprises a signal coincidence distribution and a noise coincidence distribution. Further, the instructions cause the processor to identify one or more reference lines indicating signal value and noise value in each of the one or more coincidence distribution sets. The one or more reference lines comprises left reference line and right reference line. Thereafter, the instructions cause the processor to determine a time window in the one or more coincidence distribution sets by iteratively adjusting the one or more reference lines in incremental steps until at least one of, one or more performance parameters, signal value and noise value within the time window complies with one or more predefined requirements. Finally, the instructions cause the processor to optimize performance of a QKD protocol based on the determined time window.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 2C shows an exemplary illustration of adjusting reference lines in a coincidence distribution, in accordance with some embodiments of the present disclosure;

FIG. 3A-3C shows an exemplary illustrations of optimizing a Quantum Key Distribution (QKD) protocol wherein overall QBER reaches a predefined QBER limit, in accordance with some embodiments of the present disclosure;

FIG. 4A-4C shows an exemplary illustrations of optimizing a Quantum Key Distribution (QKD) protocol wherein individual QBER reaches a predefined QBER limit, in accordance with some embodiments of the present disclosure;

FIG. 5A-5G shows an exemplary illustrations of optimizing a Quantum Key Distribution (QKD) protocol wherein overall QBER reaches a predefined QBER limit and overall key symmetry is within a predefined key symmetry, in accordance with some embodiments of the present disclosure;

FIG. 7 shows a flowchart illustrating a method of optimizing performance of a Quantum Key Distribution (QKD) protocol, in accordance with some embodiments of the present disclosure.

Figure 1:
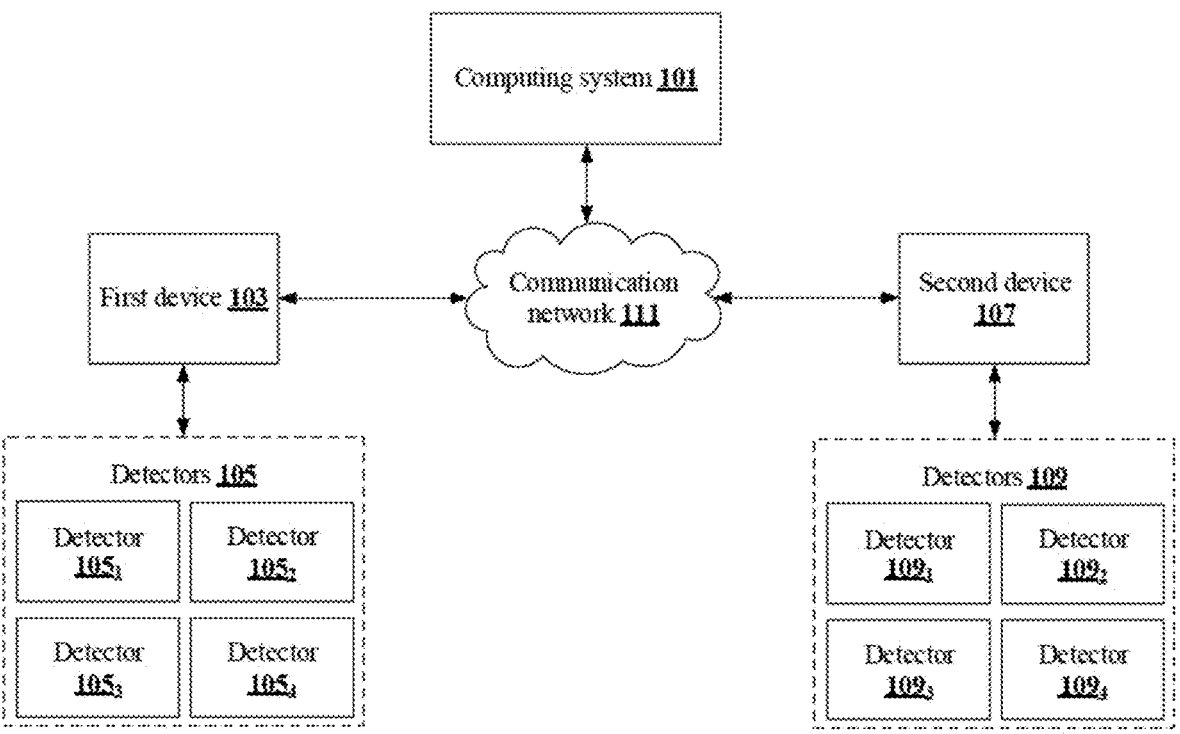
FIG. 1 shows an exemplary environment for a computing system 101 for optimizing a Quantum Key Distribution (QKD) protocol, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for a computing system for optimizing a Quantum Key Distribution (QKD) protocol, in accordance with some embodiments of the present disclosure;

Exemplary architecture 100 comprises a computing system 101, a first device 103, four single-photon detectors $105_1$-$105_4$ (collectively referred as Detectors 105) associated with the first device 103, a second device 107, four single-photon detectors $109_1$-$109_4$ (collectively referred as Detectors 109) associated with the second device 107. The first device 103 and the second device 107 may include a time tagging unit which tags digital time stamps to photon measured as analog photovoltages by each detector $105_1$-$105_4$ and $109_1$-$109_4$ respectively. The computing system 101 may be configured to receive one or more coincidence distribution sets from the time tagging unit and further computes the coincidence distribution sets. The computing system 101 may also be broadly referred to an apparatus in the context of the present disclosure. In an embodiment, a computing system 101 may be any computing unit that may be configured to optimize a Quantum Key Distribution (QKD) protocol. As an example, the computing system 101 may include, without limiting to, a desktop computer, a laptop, a server, a mobile device and the like. The computing system 101 may be associated with a first device 103 and a second device 107 using a predefined communication network 111. The first device 103 and the second device 107 may also communicate with each other using the predefined communication network 111. As an example, the first device 103 and the second device 107 may be a computing system such as a computer, laptop and the like. In some embodiments, the computing system 101 may be a centralized system that receives measurements corresponding to time-stamps detected by the first device 103 and the second device 107 through their respective detector pairs (discussed in detail in further part of the description) and perform the method of optimizing the QKD as disclosed in the present disclosure based on the received timestamp measurements. In some other embodiments, computing system 101 may be eliminated from the environment 100 and one of the first device 103 or the second device 107 may locally perform the functionality of the computing system 101. In an implementation, consider the first device 103 (also referred as sender device 103) may be associated with four single-photon detectors $105_1$-$105_4$. Similarly, consider the second device 107 (also referred as receiver device 107) may be associated with four single-photon detectors $109_1$-$109_4$. This arrangement of the first device 103 and the second device 107 being associated with four single-photon detectors each is only an exemplary implementation/illustration. This should not be construed as a limitation of the present disclosure. In some embodiments, each of the photon detectors $105_1$-$105_4$ and $109_1$-$109_4$ are light sensitive and are configured to detect photons of a predefined wavelength.

Figure 2A:
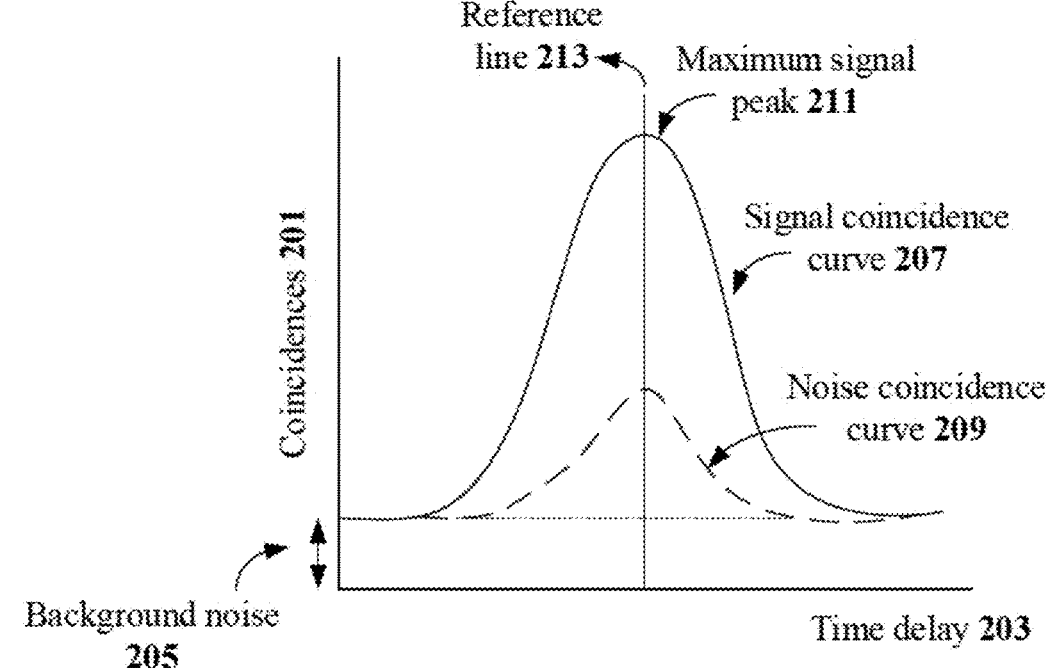
FIGS. 2A and 2B shows an exemplary illustration of a coincidence distribution, in accordance with some embodiments of the present disclosure.
Figure 2B:
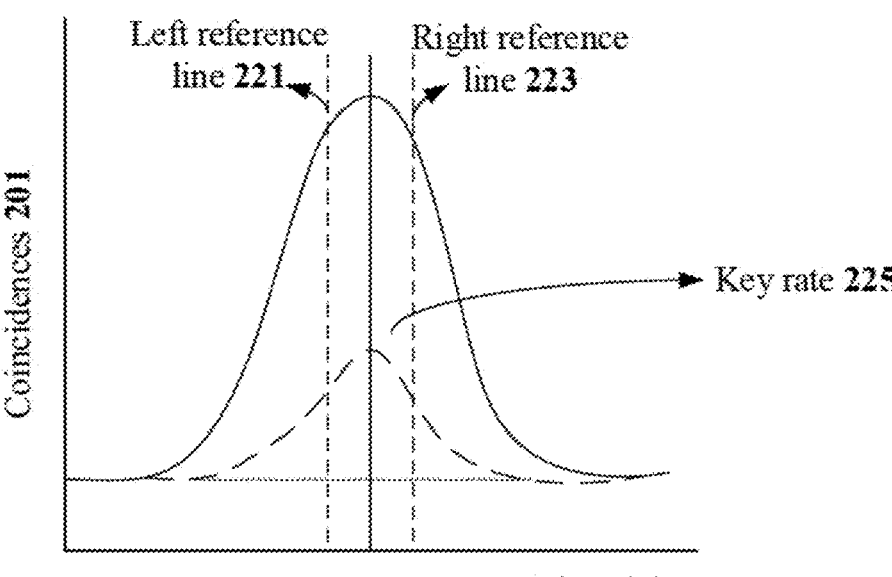

In an embodiment, the proposed method may be implemented for any existing QKD protocol. As an example, the QKD protocol may be, without limitation, BBM92 protocol and BB84 protocol. In an embodiment, the present disclosure considers BBM92 protocol to illustrate the optimization of QKD protocol. However, this should not be considered as limitation of the present disclosure. The requirement of physical equipment for the present disclosure may include, without limitation, general optics, laser, optical fibres, non-linear optics, optoelectronics including single-photon detectors, time-correlated single-photon counting devices, and polarization optics. These components are essential for implementing a BBM92 experimental setup. Once the BBM92 setup is operational, an experimenter can employ the proposed optimization strategies based on the measurements of each of the four single-photon detectors at both the first device 103 and second device 107. In an embodiment, eight coincidence detections are measured in a BBM92 protocol, four contribute to signal coincidences, while the other four contribute to noise coincidences. An exemplary illustration of the coincidence distribution set is shown in FIGS. 2A and 2B of the present disclosure.

In an embodiment, the computing system 101 may be configured to extract the one or more coincidence distribution sets generated from one or more timestamps detected during a communication by one or more detector pairs associated with the sender and the receiver of the communication. Each coincidence distribution set in the one or more coincidence distribution sets comprises a signal coincidence distribution and a noise coincidence distribution (as shown in FIGS. 2A and 2B). In an embodiment, each coincidence distribution set consists of two coincidence distributions: signal coincidence curve 207 and noise coincidence curve 209. The coincidences measured at desired detectors by performing projective measurements at the first device 103 and the second device 107 contribute to the signal coincidence curve 207, while those measured at their undesired counterparts contribute to the noise coincidence curve 209. The background noise zone 205 indicated below the flat portions of the signal coincidence curve 207 and noise coincidence curve 209 represents the unwanted coincident detection from stray light sources, leaked pump photons, and dark noise of the single-photon detectors. The total coincidences within the chosen window span, i.e., from left reference line 221 to right reference line 223 around the central maximum, from signal coincidence curve 207 contribute to the error-free key rate while from the noise coincidence curve 209, i.e., including the background noise zone 205 contribute to the Quantum-Bit-Error-Rate (QBER) and noise. In an embodiment, in real-time scenario the coincidence curves are not typically smooth functions and contain a lot of local optimal points around a central global maximum. For a perfectly entangled state, the noise coincidence curve should be flat as represented by the dashed straight line. In an embodiment, to generate these coincidence curves, the time-stamping data recorded by the two participating detectors (i.e., one from sender device 103 and other from receiver device 107) are compared and plotted as a function of their relative time difference. In the present disclosure there exist eight detectors, therefore four coincidence distribution sets may be plotted, each containing two curves.

In an embodiment, upon extracting the one or more coincidence distribution sets, the computing system 101 may be configured to identify one or more reference lines indicating signal value and noise value in each of the one or more coincidence distribution sets. The one or more reference lines comprises left reference line 221 and right reference line 223. In an embodiment, the left reference line 221 and the right reference line 223 may start with smallest possible window span (i.e., 1 picoseconds) away from the (bold) central reference line towards left and right, respectively. As shown in FIG. 2A, reference line 213 is starting at the location of maximum signal peak 211. Further, as shown in in FIG. 2B, the one or more reference lines may include, without limitation, left reference line 221 and right reference line 223.

In an embodiment, upon identifying the one or more reference lines, the computing system 101 may be configured to determine a time window in the one or more coincidence distribution sets by iteratively adjusting the one or more reference lines in incremental steps until at least one of, one or more performance parameters, signal value and noise value within the time window complies with one or more predefined requirements. The one or more predefined requirements may include, without limitation, obtaining maximum SNR and Quantum Bit Error Rate (QBER) of the determined time window is within a predefined QBER limit. In an embodiment, to determine the time window in the one or more coincidence distribution sets, the computing system 101 may be configured to adjust the left reference line 221 and right reference line 223 in equal incremental steps. As an example, the predefined limit of QBER may be 11%. In an embodiment, the left reference line 221 and the right reference line 223, as indicated with dotted vertical lines in the FIG. 2B, at around the maximal point of the coincidence distribution set, i.e., preferably at the top of the signal coincidence curve 207. Thereafter, the reference lines are moved outwards from the reference line 213 with a regular step size to increase the span using the optimization methods disclosed in FIGS. 3A-3C, 4A-4C and 5A-5G. In the present disclosure, the left reference line 221 and the right reference line 223 are metaphorical terms in nature to indicate the increase or decrease in time window on either side of the plotted graph. For instance, when the vertical line passing through the signal coincidence curve 207 and the noise coincidence curve 209 in FIG. 2A, is extended by 50 picoseconds (ps) to the left and by 50 ps to the right, it is referred as moving the left reference line 221 outward by 50 ps and moving the right reference line 223 outward by 50 ps. As shown in FIG. 2C, 2C-1 illustrates the starting phase when the one or more reference line is around the maximal point of the coincidence distribution set. Further, 2C-2, 2C-3 and 2C-4 illustrates that the computing system 101 may move the left reference line 221 and the right reference line 223 outwards with the regular step size. Therefore, the left reference line 221 and the right reference line 223 or the two window reference lines should not be construed as physical reference lines or windows in the context of the present disclosure but should be construed as two sides of the common time window.

In an embodiment, upon determining the time window, the computing system 101 may be configured to optimize performance of a QKD protocol based on the determined time window. The optimizing methods are illustrated in FIGS. 3A-3C, 4A-4C and 5A-5G. In an embodiment, the computing system 101 may identify a coincidence distribution set in the one or more coincidence distribution sets with a largest time window that meets the at least one of, one or more performance parameters, signal value and noise value within the largest time window complies with the one or more predefined requirements. As shown in FIG. 3A, the coincidence distribution set 3A-2 has the largest time window when compared with the other coincidence distribution sets 3A-1, 3A-3, 3A-4. The computing system 101 may identify the coincidence distribution set 3A-2 complying with the one or more predefined requirements. Further, the computing system 101 may adjust a time window in one or more remaining coincidence distribution sets 3A-1, 3A-3 and 3A-4 to match the largest time window of the coincidence distribution set 3A-2. The one or more remaining coincidence distribution sets are coincidence distribution sets other than the coincidence distribution set with the largest time window in the one or more coincidence distribution sets. As shown in FIG. 3B, the time window in the one or more remaining coincidence distribution sets 3B-1, 3B-3 and 3B-4 (corresponding to distribution sets 3A-1, 3A-3 and 3A-4 in FIG. 3A) are adjusted to match the time window of the coincidence distribution set 3B-2 (corresponding to coincidence distribution set 3A-2 of FIG. 3A). Thereafter, the computing system 101 may modify the time window of each of the one or more coincidence distribution sets until overall QBER of the one or more coincidence distribution sets reaches the predefined QBER limit. As shown in FIG. 3C, the time window of each of the one or more coincidence distribution sets 3C-1-3C-4 are modified until overall QBER of the one or more coincidence distribution sets reaches the predefined QBER limit.

$$\text{Key rate} = \frac{\text{coincidences from all the eight coincidence detections}}{\text{runtime of the protocol}} [\text{bps}] \quad (1)$$

$$QBER = \frac{\begin{array}{c}(\text{coincidences from the four} \\ \text{undesired coincidence detections} \times 100)\end{array}}{(\text{coincidences from all the eight coincidence detections})} [\%] \quad (2)$$

$$\text{Key symmetry} = \frac{\begin{array}{c}(\text{coincidences detected along diagonal (for first device)} \\ \text{and rotated diagonal (for second device) bases} \times 100)\end{array}}{(\text{coincidences from all the eight coincidence detections})} \quad (3)$$

In some embodiment, the computing system 101 may identify a coincidence distribution set in the one or more coincidence distribution sets with a largest time window. At least one of, one or more performance parameters, signal value and noise value within the largest time window complies with the one or more predefined requirements. As shown in FIG. 4A, the coincidence distribution set 4A-4 has the largest time window when compared with the other coincidence distribution set 4A-1, 4A-2, and 4A-3. The computing system 101 may identify the coincidence distribution set 4A-4 as complying with the one or more predefined requirements. Further, the computing system 101 may adjust a time window in one or more remaining coincidence distribution sets 4A-1, 4A-2, and 4A-3 to match the largest time window. The one or more remaining coincidence distribution sets are coincidence distribution sets other than the coincidence distribution set with the largest time window in the one or more coincidence distribution sets. As shown in FIG. 4B, the time window in the one or more remaining coincidence distribution sets 4B-1-4B-3 are adjusted to match the time window of the coincidence distribution set 4B-4. Thereafter, the computing system 101 may modify the time window of each of the one or more coincidence distribution sets until individual QBER of the one or more coincidence distribution sets reaches predefined QBER limit. As shown in FIG. 4C, the time window of each of the one or more coincidence distribution sets 4C-1-4C-4 are modified until individual QBER of the one or more coincidence distribution sets reaches the predefined QBER limit.

In some embodiment, the computing system 101 may identify a coincidence distribution set in the one or more coincidence distribution sets with a maximum Signal to Noise Ratio (SNR) and overall QBER of the one or more coincidence distribution sets is within a predefined QBER limit. As shown in FIG. 5A, the coincidence distribution set 5A-3 may be identified as the coincidence distribution set with maximum SNR when compared with the other coincidence distribution set and the overall QBER of the one or more coincidence distribution sets is within the predefined QBER limit. Further, the computing system 101 adjusts a time window of one or more remaining coincidence distribution sets to the one or more reference lines. The process of identifying the coincidence distribution set in the one or more coincidence distribution sets is performed in the one or more remaining coincidence distribution sets until the QBER reaches the predefined QBER limit and overall key symmetry of the signal is within a predefined key symmetry. As an example, the predefined key symmetry may be of a ratio limit 50:50, i.e., the number of 0's and number of 1's in the key should be same. As shown in FIG. 5B, the left reference line 221 and the right reference line 223 of the one or more remaining coincidence distribution sets 5B-1, 5B-2 and 5B-4 are adjusted to an initial starting point. Further, the process is repeated for the one or more remaining coincidence distribution sets 5B-1, 5B-2 and 5B-4. As shown in FIG. 5C, the coincidence distribution set 5C-1 may be identified as the coincidence distribution set with maximum SNR along with the coincidence distribution set 5C-3 when compared with the other coincidence distribution set and the overall QBER of the one or more coincidence distribution sets is within the predefined QBER limit. Thereafter, the process of identifying the coincidence distribution set in the one or more coincidence distribution sets is performed in the one or more remaining coincidence distribution sets 5D-2 and 5D-4. As shown in FIG. 5D, the left reference line 221 and the right reference line 223 of the one or more remaining coincidence distribution sets 5D-2 and 5D-4 are adjusted to an initial starting point. Further, the process is repeated for the one or more remaining coincidence distribution sets 5D-2 and 5D-4. As shown in FIG. 5E, the coincidence distribution set 5E-2 may be identified as the coincidence distribution set with maximum SNR along with the coincidence distribution set 5E-1 and 5E-3 when compared with the other coincidence distribution set and the overall QBER of the one or more coincidence distribution sets is within the predefined QBER limit. Finally, the process of identifying the coincidence distribution set in the one or more coincidence distribution sets is performed in the remaining coincidence distribution sets 5E-4. As shown in FIG. 5F, the left reference line 221 and the right reference line 223 of the remaining coincidence distribution sets 5F-4 are adjusted to an initial starting point. Further, the process is repeated for the remaining coincidence distribution set 5F-4. As shown in FIG. 5G, the coincidence distribution set 5G-4 may be identified as the coincidence distribution set with maximum SNR along with the coincidence distribution set 5G-1, 5G-2 and 5G-3 and the overall QBER of the one or more coincidence distribution sets is within the predefined QBER limit. Finally, the QBER of the four coincidence distribution sets 5G-1 to 5G-4 are within the predefined QBER limit and overall key symmetry of the signal is within the predefined key symmetry.

Figure 6:
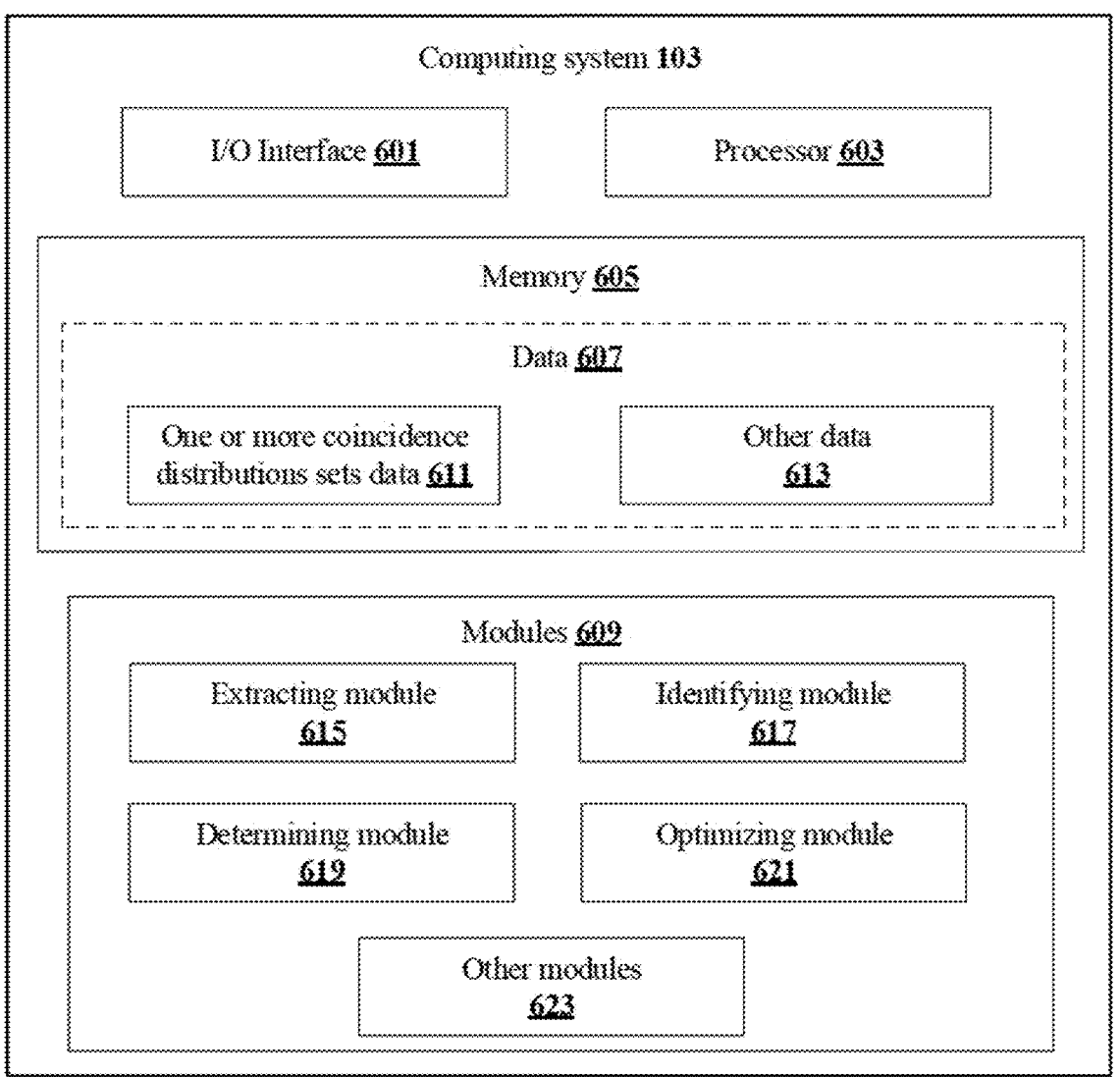
FIG. 6 shows a detailed block diagram of the proposed computing system, in accordance with some embodiments of the present disclosure.

FIG. 6 shows a detailed block diagram of the proposed computing system 101, in accordance with some embodiments of the present disclosure.

In some implementations, the computing system 101 may include an I/O interface 601, a processor 603 and a memory 605. In an embodiment, the memory 605 may be communicatively coupled to the processor 603. The processor 603 may be configured to perform one or more functions of a computing system 101 for optimizing performance of a QKD protocol, using the data 607 and the one or more modules 609 of the computing system 101. In an embodiment, the memory 605 may store the data 607.

In an embodiment, the data 607 stored in the memory 605 may include, without limitation, one or more coincidence distributions sets data 611 and other data 613. In some implementations, the data 607 may be stored within the memory 605 in the form of various data structures. Additionally, the data 607 may be organized using data models, such as relational or hierarchical data models. The other data 613 may include various temporary data and files generated by the one or more modules 609.

In an embodiment, the one or more coincidence distributions sets data 611 may include the one or more coincidence distributions sets generated from one or more timestamps detected during a communication by one or more detector pairs associated with a sender and a receiver of the communication. In an embodiment, each coincidence distribution set in the one or more coincidence distribution sets comprises a signal coincidence distribution and a noise coincidence distribution (as shown in FIGS. 2A and 2B). In some embodiment, the one or more coincidence distributions sets data 611 may also include one or more remaining coincidence distributions sets which may be generated during the optimization performance of the QKD protocol.

In an embodiment, the data 607 may be processed by the one or more modules 609 of the computing system 101. In some implementations, the one or more modules 609 may be communicatively coupled to the processor 603 for performing one or more functions of the computing system 101. In an implementation, the one or more modules 609 may include, without limiting to, an extracting module 615, an identifying module 617, a determining module 619, optimizing module 621 and other modules 623.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 609 may be configured as stand-alone hardware computing system 101s. In an embodiment, the other modules 623 may be used to perform various miscellaneous functionalities on the computing system 101. It will be appreciated that such one or more modules 609 may be represented as a single module or a combination of different modules.

In an embodiment, the extracting module 615 may be configured to extract one or more coincidence distribution sets generated from one or more timestamps detected during a communication by one or more detector pairs associated with a sender and a receiver of the communication. Each coincidence distribution set in the one or more coincidence distribution sets comprises a signal coincidence distribution and a noise coincidence distribution.

In an embodiment, the identifying module 617 may be configured to identify one or more reference lines indicating signal value and noise value in each of the one or more coincidence distribution sets. The one or more reference lines may include, without limitation, left reference line 221 and right reference line 223.

In an embodiment, the determining module 619 may be configured to determine a time window in the one or more coincidence distribution sets by iteratively adjusting the one or more reference lines in incremental steps until at least one of, one or more performance parameters, signal value and noise value within the time window complies with one or more predefined requirements. In an embodiment, to determine the time window in the one or more coincidence distribution sets, the determining module 619 may be configured to adjust the left reference line 221 and right reference line 223 in equal incremental steps. In an embodiment, adjusting the one or more reference lines comprises varying the time delays by a predefined value.

In an embodiment, the optimizing module 621 may be configured to optimize performance of a Quantum Key Distribution (QKD) protocol based on the determined time window. In an embodiment, to optimize protocol of the QKD protocol, the optimizing module 621 may identify a coincidence distribution set in the one or more coincidence distribution sets with a largest time window until at least one of, one or more performance parameters, signal value and noise value within the largest time window complies with the one or more predefined requirements. Further, the optimizing module 621 may adjust a time window in one or more remaining coincidence distribution sets to match the largest time window. The one or more remaining coincidence distribution sets are coincidence distribution sets other than the coincidence distribution set with the largest time window in the one or more coincidence distribution sets. Thereafter, the optimizing module 621 may modify the time window of each of the one or more coincidence distribution sets until overall QBER of the one or more coincidence distribution sets reaches a predefined QBER limit.

In some embodiments, to optimize performance of the QKD protocol, the optimizing module 621 may identify a coincidence distribution set in the one or more coincidence distribution sets with a largest time window. The at least one of, one or more performance parameters, signal value and noise value within the largest time window complies with the one or more predefined requirements. Further, the optimizing module 621 may adjust a time window in one or more remaining coincidence distribution sets to match the largest time window. The one or more remaining coincidence distribution sets are coincidence distribution sets other than the coincidence distribution set with the largest time window in the one or more coincidence distribution sets. Thereafter, the optimizing module 621 may modify the time window of each of the one or more coincidence distribution sets until individual QBER of the one or more coincidence distribution sets reaches predefined QBER limit.

In some embodiments, to optimize performance of the QKD protocol, the optimizing module 621 may identify a coincidence distribution set in the one or more coincidence distribution sets with a maximum Signal to Noise Ratio (SNR) and overall QBER of the one or more coincidence distribution sets is within the predefined QBER limit. Further, the optimizing module 621 may adjust a time window of one or more remaining coincidence distribution sets to the one or more reference lines. The process of identifying the coincidence distribution set in the one or more coincidence distribution sets is performed in the one or more remaining coincidence distribution sets until the QBER reaches the predefined QBER limit and overall key symmetry of the signal is within a predefined key symmetry.

FIG. 7 shows a flowchart illustrating a method of optimizing performance of a Quantum Key Distribution (QKD) protocol, in accordance with some embodiments of the present disclosure.

As illustrated in FIG. 7, the method 700 may include one or more blocks illustrating a method of optimizing performance of a Quantum Key Distribution (QKD) protocol. The method 700 may be described in the general context of computer executable instructions. Generally, computer executable instructions can include routines, programs, objects, components, data structures, procedures, modules, and functions, which perform specific functions or implement specific abstract data types.

The order in which the method 700 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 701, the method 700 includes extracting, by a processor 603 of a computing system 101, one or more coincidence distribution sets generated from one or more timestamps detected during a communication by one or more detector pairs associated with a sender and a receiver of the communication. Each coincidence distribution set in the one or more coincidence distribution sets comprises a signal coincidence distribution and a noise coincidence distribution.

At block 703, the method 700 includes identifying, by the processor 603, one or more reference lines indicating signal value and noise value in each of the one or more coincidence distribution sets. The one or more reference lines comprises left reference line 221 and right reference line 223.

At block 705, the method 700 includes determining, by the processor 603, a time window in the one or more coincidence distribution sets by iteratively adjusting the one or more reference lines in incremental steps until at least one of, one or more performance parameters, signal value and noise value within the time window complies with one or more predefined requirements. The one or more predefined requirements may include, without limitation, obtaining maximum SNR and Quantum Bit Error Rate (QBER) of the determined time window is within a predefined QBER limit. In an embodiment, to determine the time window in the one or more coincidence distribution sets, the processor 603 adjusts the left reference line 221 and right reference line 223 in equal incremental steps. In an embodiment, adjusting the one or more reference lines comprises varying the time delays by a predefined value.

At block 707, the method 700 includes optimizing, by the processor 603, performance of a QKD protocol based on the determined time window. In an embodiment, to optimize the QKD protocol the processor 603 may identify a coincidence distribution set in the one or more coincidence distribution sets with a largest time window The at least one of, one or more performance parameters, signal value and noise value within the largest time window complies with the one or more predefined requirements. Further, the processor 603 may adjust a time window in one or more remaining coincidence distribution sets to match the largest time window. The one or more remaining coincidence distribution sets are coincidence distribution sets other than the coincidence distribution set with the largest time window in the one or more coincidence distribution sets. Thereafter, the processor 603 may modify the time window of each of the one or more coincidence distribution sets until overall QBER of the one or more coincidence distribution sets reaches a predefined QBER limit. In some embodiments, to optimize the QKD protocol the processor 603 may identify a coincidence distribution set in the one or more coincidence distribution sets with a largest time window. The at least one of, one or more performance parameters, signal value and noise value within the largest time window complies with the one or more predefined requirements. Further, the processor 603 may adjust a time window in one or more remaining coincidence distribution sets to match the largest time window. The one or more remaining coincidence distribution sets are coincidence distribution sets other than the coincidence distribution set with the largest time window in the one or more coincidence distribution sets. Thereafter, the processor 603 may modify the time window of each of the one or more coincidence distribution sets until individual QBER of the one or more coincidence distribution sets reaches predefined QBER limit. In some embodiments, to optimize the QKD protocol the processor 603 may identify a coincidence distribution set in the one or more coincidence distribution sets with a maximum Signal to Noise Ratio (SNR) and overall Quantum Bit Error Rate (QBER) of the one or more coincidence distribution sets is within a predefined QBER limit. Further, the processor 603 may adjust a time window of one or more remaining coincidence distribution sets to the one or more reference lines. The process of identifying the coincidence distribution set in the one or more coincidence distribution sets is performed in the one or more remaining coincidence distribution sets until the QBER reaches the predefined QBER limit and overall key symmetry of the signal is within a predefined key symmetry.

Computer System

Figure 8:
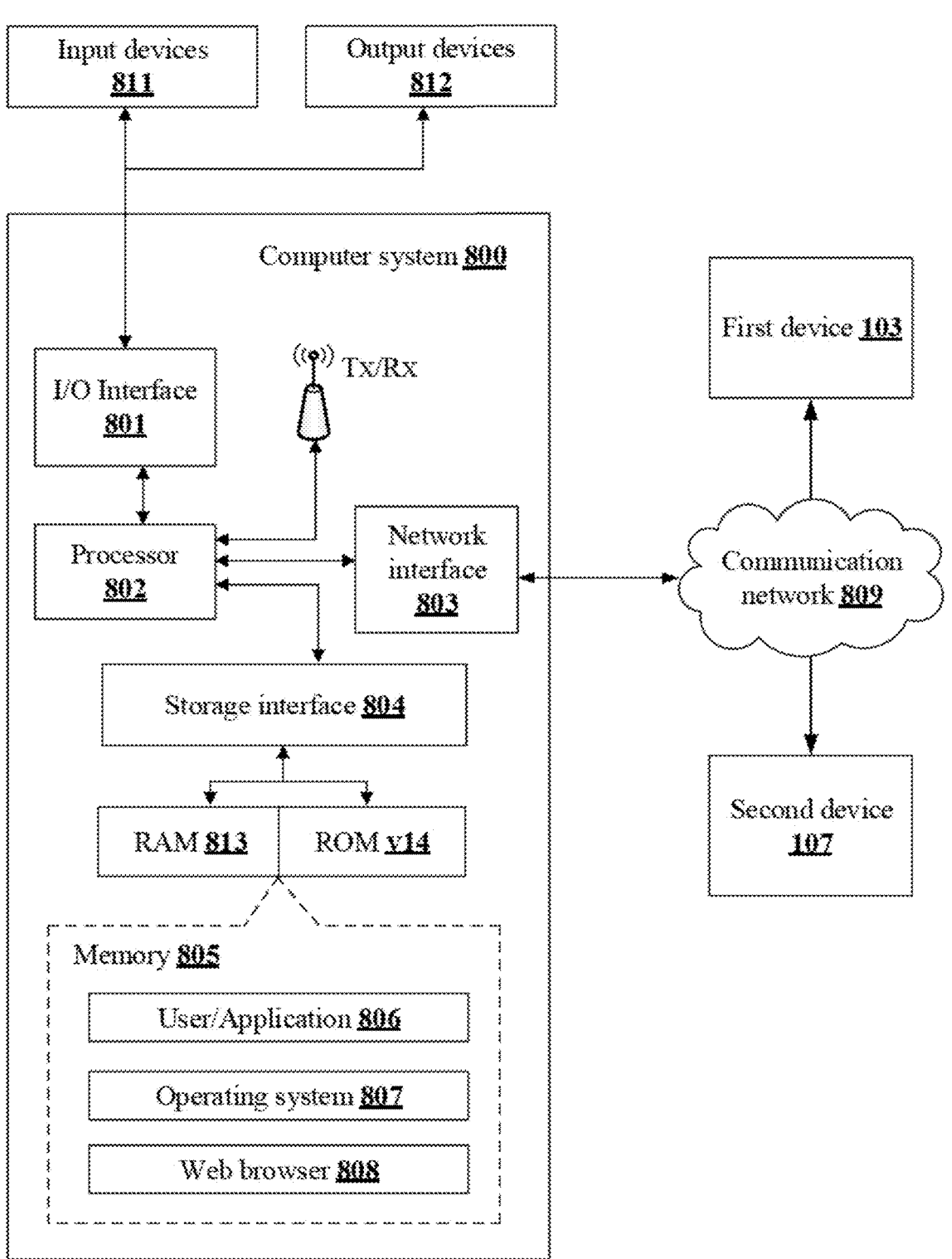
FIG. 8 illustrates a block diagram of an exemplary computer system for implementing embodiments consistent with the present disclosure.

FIG. 8 illustrates a block diagram of an exemplary computer system 800 for implementing embodiments consistent with the present disclosure. In an embodiment, the computer system 800 may be the computing system 101 illustrated in FIG. 1. The computer system 800 may include a central processing unit ("CPU" or "processor" or "memory controller") 802. The processor 802 may comprise at least one data processor for executing program components for executing user- or system-generated business processes. A user may include a person, a person using a device such as such as those included in this invention, or such a device itself. The processor 802 may include specialized processing units such as integrated system (bus) controllers, memory controllers/ memory management control units, floating point units, graphics processing units, digital signal processing units, etc.

The processor 802 may be disposed in communication with one or more Input/Output (I/O) devices (811 and 812) via I/O interface 801. The I/O interface 801 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), highdefinition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 801, the computer system 800 may communicate with one or more I/O devices 811 and 812.

In some embodiments, the processor 802 may be disposed in communication with a communication network 809 via a network interface 803. The network interface 803 may communicate with the communication network 809. The network interface 803 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc.

In an implementation, the communication network 809 may be implemented as one of the several types of networks, such as intranet or Local Area Network (LAN) and such within the organization. The communication network 809 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the communication network 809 may include a variety of network devices, including routers, bridges, servers, computing devices, storage devices, etc. Using the network interface 803 and the communication network 809, the computer system 800 may communicate with first device 103 and second device 107.

In some embodiments, the processor 802 may be disposed in communication with a memory 805 (e.g., RAM 813, ROM 814, etc. as shown in FIG. 8) via a storage interface 804. The storage interface 804 may connect to memory 805 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, user/application interface 806, an operating system 807, a web browser 808, and the like. In some embodiments, computer system 800 may store user/application data 806, such as the data, variables, records, etc. as described in this invention. Such databases may be implemented as fault-tolerant, relational, scalable, secure databases such as Oracle® or Sybase®.

The operating system 807 may facilitate resource management and operation of the computer system 800. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 806 may facilitate display, execution, interaction, manipulation, or operation of program components through textual or graphical facilities. For example, the user interface 806 may provide computer interaction interface elements on a display system operatively connected to the computer system 800, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 808 may be a hypertext viewing application. Secure web browsing may be provided using Secure Hypertext Transport Protocol (HTTPS), Secure Sockets Layer (SSL), Transport Layer Security (TLS), and the like. The web browsers 808 may utilize facilities such as AJAX, DHTML, ADOBE® FLASH®, JAVASCRIPT®, JAVA®, Application Programming Interfaces (APIs), and the like. Further, the computer system 800 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 800 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein

In an embodiment, the proposed optimization methods in the present disclosure optimizes the individual Signal-to-Noise Ratio (SNR) while restricting the Quantum Bit Error Rate (QBER) to a predefined limit to achieve a maximal key rate that is, ensuring that the generated key string remains information-theoretically secure.

In an embodiment, the proposed optimization methods in the present disclosure dynamically optimizes the window span in each of the coincidence curve sets. This helps in achieving a maximal key rate and minimum QBER.

In an embodiment, the proposed optimization methods in the present disclosure potentially offers the opportunity to prevent any partial leakage of information to the eavesdropper even from the analysis of the individual coincidence curve sets.

In an embodiment, the proposed optimization methods in the present disclosure ensures a symmetrized distribution of zero and one bits in the key string which eliminates security concerns that may arise due to an imbalanced key symmetry.

In light of the technical advancements provided by the disclosed method and apparatus, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Computing system |
| 103 | First device |
| $105_1$-$105_N$ | Detectors of first device |
| 107 | Second device |
| $109_1$-$109_N$ | Detectors of second device |
| 111 | Communication network |
| 201 | Coincidences |
| 203 | Time delay |
| 205 | Background noise |
| 207 | Signal coincidence curve |
| 209 | Noise coincidence curve |
| 211 | Maximum signal peak |
| 213 | Reference line |
| 221 | Left reference line |
| 223 | Right reference line |
| 225 | Key rate |
| 601 | I/O Interface |
| 603 | Processor |
| 605 | Memory |
| 607 | Data |
| 609 | Modules |
| 611 | One or more coincidence distributions data |
| 613 | Other data |
| 615 | Extracting module |
| 617 | Identifying module |
| 619 | Determining module |
| 621 | Optimizing module |
| 623 | Other modules |
| 800 | Computer system |
| 801 | I/O Interface of the exemplary computer system |
| 802 | Processor of the exemplary computer system |
| 803 | Network interface |
| 804 | Storage interface |
| 805 | Memory of the exemplary computer system |
| 806 | User/Application |
| 807 | Operating system |
| 808 | Web browser |
| 809 | Communication network |
| 811 | Input devices |
| 812 | Output devices |
| 813 | RAM |
| 814 | ROM |

We claim:

1. A method of optimizing performance of a Quantum Key Distribution (QKD) protocol, the method comprising:

extracting, by a computing system, one or more coincidence distribution sets generated from one or more timestamps detected during a communication by one or more detector pairs associated with a sender and a receiver of the communication, wherein each coincidence distribution set in the one or more coincidence distribution sets comprises a signal coincidence distribution and a noise coincidence distribution;

identifying, by the computing system, one or more reference lines indicating signal value and noise value in each of the one or more coincidence distribution sets, wherein the one or more reference lines comprises left reference line and right reference line;

determining, by the computing system, a time window in the one or more coincidence distribution sets by iteratively adjusting the one or more reference lines in incremental steps until at least one of, one or more performance parameters, signal value and noise value within the time window complies with one or more predefined requirements; and optimizing, by the computing system, performance of a Quantum Key Distribution (QKD) protocol based on the determined time window.

2. The method as claimed in claim 1, wherein optimizing the QKD protocol comprises:

identifying, by the computing system, a coincidence distribution set in the one or more coincidence distribution sets with a largest time window, wherein the at least one of, one or more performance parameters, signal value and noise value within the largest time window complies with the one or more predefined requirements;

adjusting, by the computing system, a time window in one or more remaining coincidence distribution sets to match the largest time window, wherein the one or more remaining coincidence distribution sets are coincidence distribution sets other than the coincidence distribution set with the largest time window in the one or more coincidence distribution sets; and modifying, by the computing system, the time window of each of the one or more coincidence distribution sets until overall Quantum Bit Error Rate (QBER) of the one or more coincidence distribution sets reaches a predefined QBER limit.

3. The method as claimed in claim 1, wherein optimizing the QKD protocol comprises:

identifying, by the computing system, a coincidence distribution set in the one or more coincidence distribution sets with a largest time window, wherein the at least one of, one or more performance parameters, signal value and noise value within the largest time window complies with the one or more predefined requirements;

adjusting, by the computing system, a time window in one or more remaining coincidence distribution sets to match the largest time window, wherein the one or more remaining coincidence distribution sets are coincidence distribution sets other than the coincidence distribution set with the largest time window in the one or more coincidence distribution sets; and modifying, by the computing system, the time window of each of the one or more coincidence distribution sets until individual Quantum Bit Error Rate (QBER) of the one or more coincidence distribution sets reaches predefined QBER limit.

4. The method as claimed in claim 1, wherein optimizing the QKD protocol comprises:

identifying, by the computing system, a coincidence distribution set in the one or more coincidence distribution sets with a maximum Signal to Noise Ratio (SNR) and overall Quantum Bit Error Rate (QBER) of the one or more coincidence distribution sets is within a predefined QBER limit; and adjusting, by the computing system, a time window of one or more remaining coincidence distribution sets to the one or more reference lines, wherein the process of identifying the coincidence distribution set in the one or more coincidence distribution sets is performed in the one or more remaining coincidence distribution sets until the QBER reaches the predefined QBER limit and overall key symmetry of the signal is within a predefined key symmetry.

5. The method as claimed in claim 1, wherein the one or more predefined requirements comprises obtaining maximum Signal to Noise Ratio (SNR) and Quantum Bit Error Rate (QBER) of the determined time window is within a predefined QBER limit.

6. The method as claimed in claim 1, wherein determining the time window in the one or more coincidence distribution sets comprises adjusting the left reference line and right reference line in equal incremental steps.

7. The method as claimed in claim 6, wherein adjusting the one or more reference lines comprises varying the time delays by a predefined value.

8. A computing system for optimizing performance of a Quantum Key Distribution (QKD) protocol, the computing system comprising:

a processor; and a memory, communicatively coupled to the processor, wherein the memory stores processor executable instructions, which, on execution, causes the processor to:

extract one or more coincidence distribution sets generated from one or more timestamps detected during a communication by one or more detector pairs associated with a sender and a receiver of the communication, wherein each coincidence distribution set in the one or more coincidence distribution sets comprises a signal coincidence distribution and a noise coincidence distribution;

identify one or more reference lines indicating signal value and noise value in each of the one or more coincidence distribution sets, wherein the one or more reference lines comprises left reference line and right reference line;

determine a time window in the one or more coincidence distribution sets by iteratively adjusting the one or more reference lines in incremental steps until at least one of, one or more performance parameters, signal value and noise value within the time window complies with one or more predefined requirements; and optimize performance of a Quantum Key Distribution (QKD) protocol based on the determined time window.

9. The computing system as claimed in claim 8, wherein to optimize the QKD protocol the processor is configured to:

identify a coincidence distribution set in the one or more coincidence distribution sets with a largest time window, wherein the at least one of, one or more performance parameters, signal value and noise value within the largest time window complies with the one or more predefined requirements;

adjust a time window in one or more remaining coincidence distribution sets to match the largest time window, wherein the one or more remaining coincidence distribution sets are coincidence distribution sets other than the coincidence distribution set with the largest time window in the one or more coincidence distribution sets; and modify the time window of each of the one or more coincidence distribution sets until overall Quantum Bit Error Rate (QBER) of the one or more coincidence distribution sets reaches a predefined QBER limit.

10. The computing system as claimed in claim 8, wherein to optimize the QKD protocol the processor is configured to:

identify a coincidence distribution set in the one or more coincidence distribution sets with a largest time window, wherein the at least one of, one or more performance parameters, signal value and noise value within the largest time window complies with the one or more predefined requirements;

adjust a time window in one or more remaining coincidence distribution sets to match the largest time window, wherein the one or more remaining coincidence distribution sets are coincidence distribution sets other than the coincidence distribution set with the largest time window in the one or more coincidence distribution sets; and modify the time window of each of the one or more coincidence distribution sets until individual Quantum Bit Error Rate (QBER) of the one or more coincidence distribution sets reaches predefined QBER limit.

11. The computing system as claimed in claim 8, wherein to optimize the QKD protocol the processor is configured to:

identify a coincidence distribution set in the one or more coincidence distribution sets with a maximum Signal to Noise Ratio (SNR) and overall Quantum Bit Error Rate (QBER) of the one or more coincidence distribution sets is within a predefined QBER limit; and adjust a time window of one or more remaining coincidence distribution sets to the one or more reference lines, wherein the process of identifying the coincidence distribution set in the one or more coincidence distribution sets is performed in the one or more remaining coincidence distribution sets until the QBER reaches the predefined QBER limit and overall key symmetry of the signal is within a predefined key symmetry.

12. The computing system as claimed in claim 8, wherein the one or more predefined requirements comprises obtaining maximum Signal to Noise Ratio (SNR) and Quantum Bit Error Rate (QBER) of the determined time window is within a predefined QBER limit.

13. The computing system as claimed in claim 8, wherein to determine the time window in the one or more coincidence distribution sets, the processor is configured to adjust the left reference line and right reference line in equal incremental steps.

14. The computing system as claimed in claim 13, wherein adjusting the one or more reference lines comprises varying the time delays by a predefined value.

15. A non-transitory computer readable medium including instructions stored thereon that when processed by at least one processor, cause a computing system to perform operations comprising:

extracting one or more coincidence distribution sets generated from one or more timestamps detected during a communication by one or more detector pairs associated with a sender and a receiver of the communication, wherein each coincidence distribution set in the one or more coincidence distribution sets comprises a signal coincidence distribution and a noise coincidence distribution;

identifying one or more reference lines indicating signal value and noise value in each of the one or more coincidence distribution sets, wherein the one or more reference lines comprises left reference line and right reference line;

determining a time window in the one or more coincidence distribution sets by iteratively adjusting the one or more reference lines in incremental steps until at least one of, one or more performance parameters, signal value and noise value within the time window complies with one or more predefined requirements; and optimizing performance of a Quantum Key Distribution (QKD) protocol based on the determined time window.

* * * * *